United States Patent [19]
Minegishi

[11] Patent Number: 5,835,294
[45] Date of Patent: Nov. 10, 1998

[54] WIDE-ANGLE SIDE-MIRROR DEVICE

[76] Inventor: Norio Minegishi, Mutsumi-so, No. 25-16, Sano 2-chome, Adachi-ku, Tokyo, Japan

[21] Appl. No.: 695,778

[22] Filed: Aug. 7, 1996

[51] Int. Cl.[6] ............................... G02B 5/08; G02B 5/10
[52] U.S. Cl. ......................... 359/857; 359/858; 359/859; 359/866
[58] Field of Search ................................... 359/857, 858, 359/859, 864, 866

[56] References Cited

U.S. PATENT DOCUMENTS

| Re. 17,274 | 4/1929 | Porter | 359/864 |
| 4,271,360 | 6/1981 | Ward | 359/857 |

FOREIGN PATENT DOCUMENTS

| 0210757 | 2/1987 | European Pat. Off. | 359/864 |
| 004040839 | 6/1992 | Germany | 359/864 |
| U-57-96052 | 6/1982 | Japan . | |
| U-61-46256 | 3/1986 | Japan . | |

*Primary Examiner*—Davis L. Willis
*Assistant Examiner*—Mohammad Y. Sikder
*Attorney, Agent, or Firm*—Griffin, Butler, Whisenhunt & Szipl, LLP

[57] ABSTRACT

A wide-angle side mirror device with a mirror box having a front and a rear, and first and second side walls. An object window is disposed in the first side wall of the mirror box. An observation window is disposed in the second wall of the mirror box. An object mirror having a curved shape which is concave in horizontal cross section and convex in vertical cross section is disposed to face out the object window and diagonally rearwards. An observation mirror is disposed in the mirror box to reflect a mirror image from the object mirror through the observation window. The object mirror preferably has a doughnut or drum shape, and more preferably has a degree of curvature in horizontal cross section approximately the same as a degree of curvature in vertical cross section. The observation mirror is preferably a flat mirror. The device has a wide field of view and allows the driver of a vehicle to view road conditions at acute angle intersections from the driver's seat.

21 Claims, 7 Drawing Sheets

WIDE-ANGLE SIDE-MIRROR DEVICE

BACKGROUND OF THE INVENTION

1. Field of the Invention

The present invention relates to a wide-angle side-mirror device which mainly provides a rear field of view of the sides of trucks, and in particular provides a wide rear field of view so that the road conditions of a road intersecting an acute angle intersection at an acute angle can be visibly confirmed in a reliable manner.

2. Description of the Related Art

Regarding operating an automotive vehicle, confirmability of the conditions around the driver's side of the vehicle is generally maintained by means of the driver viewing the field of view toward the rear of the drivers seat both directly and through a side-mirror comprised of a convex mirror situated on the automobile frame forward of the driver's seat, thus safety in traffic is generally secured. However, in the case of viewing the field of view toward the rear of the side opposite the driver's side of the vehicle, i.e., the passenger side of the vehicle, confirmation can be made by the passenger in the event that a passenger is on board, but in the event that the vehicle is being operated by a driver alone, confirmation of the field of view toward the rear of the passenger side must depend on a side-mirror device, this being particularly true in the case of trucks.

Accordingly, various side-mirror devices for the passenger side have been provided. All have been comprised mainly of a convex mirror, with one example being a convex mirror proper being situated on the automobile frame forward of the passenger seat in a projected manner (refer to reference numeral 20 in FIG. 7). However, according to this arrangement, only a certain angle range of view, i.e., an acute angle, from the side of the vehicle can be secured along the vehicle (refer to q 2 in FIG. 7), so that confirmation of the road conditions of, e.g., a road intersecting an acute angle the road upon which the vehicle is proceeding at an acute angle intersection can not be made.

Figure 10:
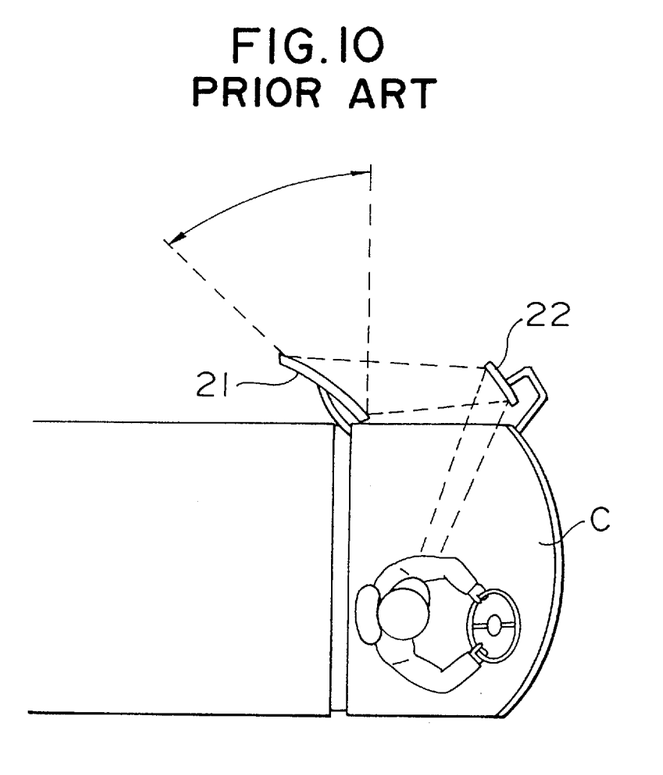
FIG. 10 is a schematic cross-section view illustrating the angle of view according to the side-mirror device according to a known example comprising a combination of a convex mirror and flat mirror.

In order to deal with such problems, there has been, e.g., a lateral projection mirror disclosed in Japanese Unexamined Utility Model Publication No. 54-139439. As shown in FIG. 10, this system is comprised of a convex mirror 21 mounted toward the rear of the passenger seat of the vehicle C, at an angle to the direction of progression of the vehicle, and a flat or concave reflection mirror 22 mounted toward the front of this passenger seat, by which reflection mirror 22 a projected image cast by the convex mirror 21 is reflected, thus providing means for securing the field of view toward the rear of the passenger side of the vehicle C.

However, according to the lateral projection mirror shown in FIG. 10, the width of the convex mirror 21 must be great in order to enlarge the field of view toward the rear. Thus, the convex mirror protrudes greatly from the side of the vehicle C which is both obstructive and dangerous, and further, wind resistance during driving is increased and consequently fuel costs are increased.

On the other hand, in the event that a concave mirror is used, the reflected image thereof becomes unclear and fuzzy; and in the event that a concave spherical mirror is used, the image is inverted vertically, resulting in an image that is different from actuality when viewed from the driver's seat, and it is known that such an image is completely unusable.

SUMMARY OF THE INVENTION

Accordingly, it is an object of the present invention to provide a wide-angle side-mirror which allows for the driver of a vehicle to confirm, from the driver's seat, a clear and wide image of the road conditions of a road intersecting an acute angle intersection at an acute angle from the direction of behind the passenger side.

It is another object of the present invention to provide a wide-angle side-mirror which does not protrude from the body of the vehicle in a marked manner, thus allowing for safe and efficient operation.

In light of the aforementioned, the inventor of the present invention has discovered that by means of employing a mirror which is shaped like part of a doughnut, i.e., concave in the horizontal x-axial direction and convex in the vertical y-axial direction, an image can be obtained from a compact mirror which is clear and wide, and thus has made the present invention. That is, the present invention is comprised of a doughnut-shaped mirror serving as an object mirror and a flat mirror serving as an observation mirror, whereby a wide-angle side mirror has successfully been provided wherein the field of view does not become narrow or small even when the aforementioned object mirror and observation mirror are placed in close proximity, and wherein the road conditions of a road intersecting an acute angle intersection at an acute angle from the direction of behind the passenger side can be visibly confirmed in a reliable manner from the driver's seat. Confirmation in such a situation has been considered difficult with the known art. Moreover, the present invention does not need to be mounted outside the vehicle but can be mounted within the vehicle, so that the mirror does not protrude from the body of the vehicle in a marked manner, thus successfully providing a wide-angle side-mirror which can be used safely.

In order to achieve the aforementioned objects, the present invention comprises: a mirror box 1 provided along the lengthwise direction of the side of a vehicle C; an object window 2 provided toward the front of the outer wall of the aforementioned mirror box facing outwards from the vehicle; an observation window 3 provided toward the rear of the inner wall of the aforementioned mirror box facing the vehicle inward; an object mirror 10 having a doughnut-shaped mirror surface or a drum-shaped mirror surface which has a continuously curved formation so that a cross-section made in the horizontal direction is a concave surface retracted in a concave manner and a cross-section made in the vertical direction is a convex surface bulging in a convex manner, the aforementioned object mirror 10 being provided within the mirror box 1 at the object window 2 so as to face diagonally rearwards; and an observation mirror 11 provided facing forwards within the mirror box 1 at the observation window 3 so as to reflect the projected mirror image from the object mirror 10 toward the interior of the vehicle.

The degree of curvature of the concave and convex planes of the doughnut-shaped mirror surface of the object mirror 10 are approximately the same, the observation window 11 is provided as a flat mirror, and the object mirror 10 and the observation mirror are positioned and fixed so as to face the object window 2 and the observation window 3, respectively. The mirror box 1 is mounted to the interior side of the window-glass G on the passenger side of the vehicle C, or linkedly fixed to a vehicle frame or pillar around the window-glass G on the passenger side of the vehicle C, or such like manner.

Due to the object mirror 10 provided to the wide-angle side-mirror device according to the present invention and pointed in a direction diagonally rearward being formed as a doughnut-shaped surface or a drum-shaped mirror surface which is curved so that a cross-section made in the horizontal direction is a concave surface and a cross-section made in the vertical direction is a convex surface, the scenery in the diagonally rearward direction outside of the vehicle is formed into a projected mirror image which can be viewed as a non-reverse erect image while maintaining a wide angle of view.

Although the projected image obtained by this object mirror 10 appears inverted when viewed by the driver, due to being reflected off of the observation mirror 11, the field of view is wide, and the road conditions of a road intersecting an acute angle intersection at an acute angle from the direction of behind the passenger side, for example, can be confirmed from the driver's seat in a reliable manner.

Also, the entire device is made small by means of placing the object mirror 10, which faces diagonally rearward, and the observation mirror ll, which faces diagonally forward, in close proximity to each other within the mirror box 1. A sufficiently wide angle of view is formed even though the device is provided within the vehicle, due to the device being fixed to the inner side of the window-glass G.

DESCRIPTION OF THE PREFERRED EMBODIMENT

Description of an embodiment of the present invention will be made with reference to the drawings. Although the description will be made with the embodiment of the present invention being implemented in a vehicle with the steering wheel on the right side, implementation regarding a vehicle with the steering wheel on the left side can be conducted simply by constructing the device in a horizontally or vertically inverted manner. Thus, explanation of the later will be omitted, since one in the trade can sufficiently understand this principle.

Figures 4, 5, 6:
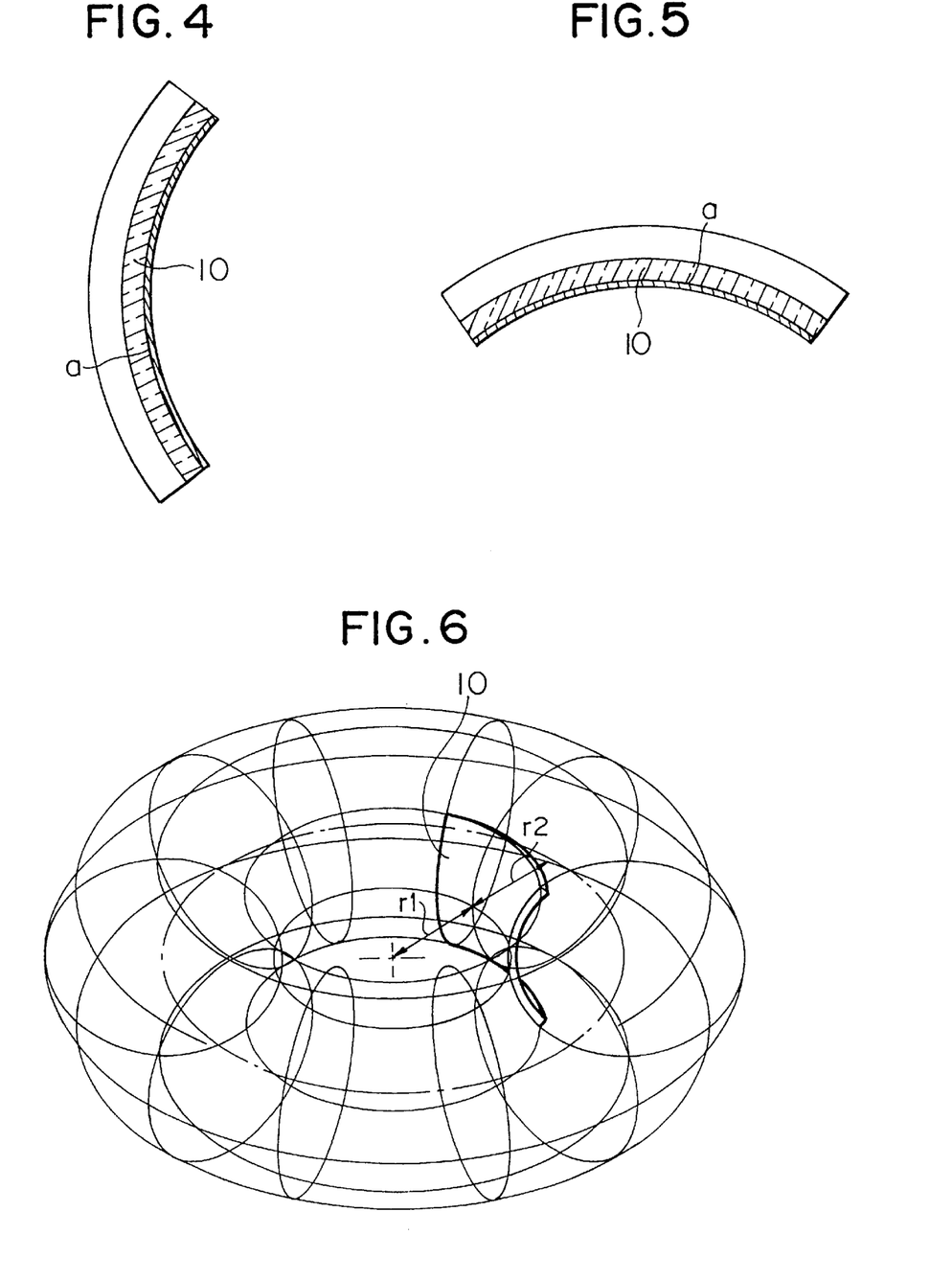
FIG. 4 is a cross-section view along the line IV—IV in FIG. 3, viewed in the direction shown by the arrow.
FIG. 5 is a cross-section view along the line V—V in FIG. 3, viewed in the direction shown by the arrow.
FIG. 6 is a perspective view of a doughnut-shaped object in the event that the object mirror is to be formed from part of a doughnut-shaped object.

In the FIG. 5, reference numeral 1 denotes a mirror box which is fixed and mounted to the inner side of the window-glass G of the passenger side of a vehicle such as a truck. The mirror box has an almost rectangular form which is long in the front-to-rear direction of the vehicle, and is provided with an object window 2 provided toward the front of the outer wall of the mirror box facing outwards from the vehicle and an observation window 3 provided toward the rear of the inner wall of the mirror box facing inward of the vehicle. Further, in addition to the object window facing outwards, consideration is made regarding the later-described object mirror 10 provided related to the object window 2 being curved in such a manner that the upper and lower portions thereof face upward and downward so that the object field of view reaches diagonally upward and downward; accordingly, the object window 2 is not only formed so as to face outwards, but is also continuously connected with upper and lower windows 4.

Also, the side of the mirror box 1 which faces the outside of the vehicle is slightly slanted upwards, so that when the side-mirror device according to the present invention is situated on the inner side of the window-glass G, the side which faces the outside of the vehicle is in contact with the inner side of the window-glass G on the passenger side which is slanted downwards, thus stably maintaining the entire device at an almost level state.

Figure 1:
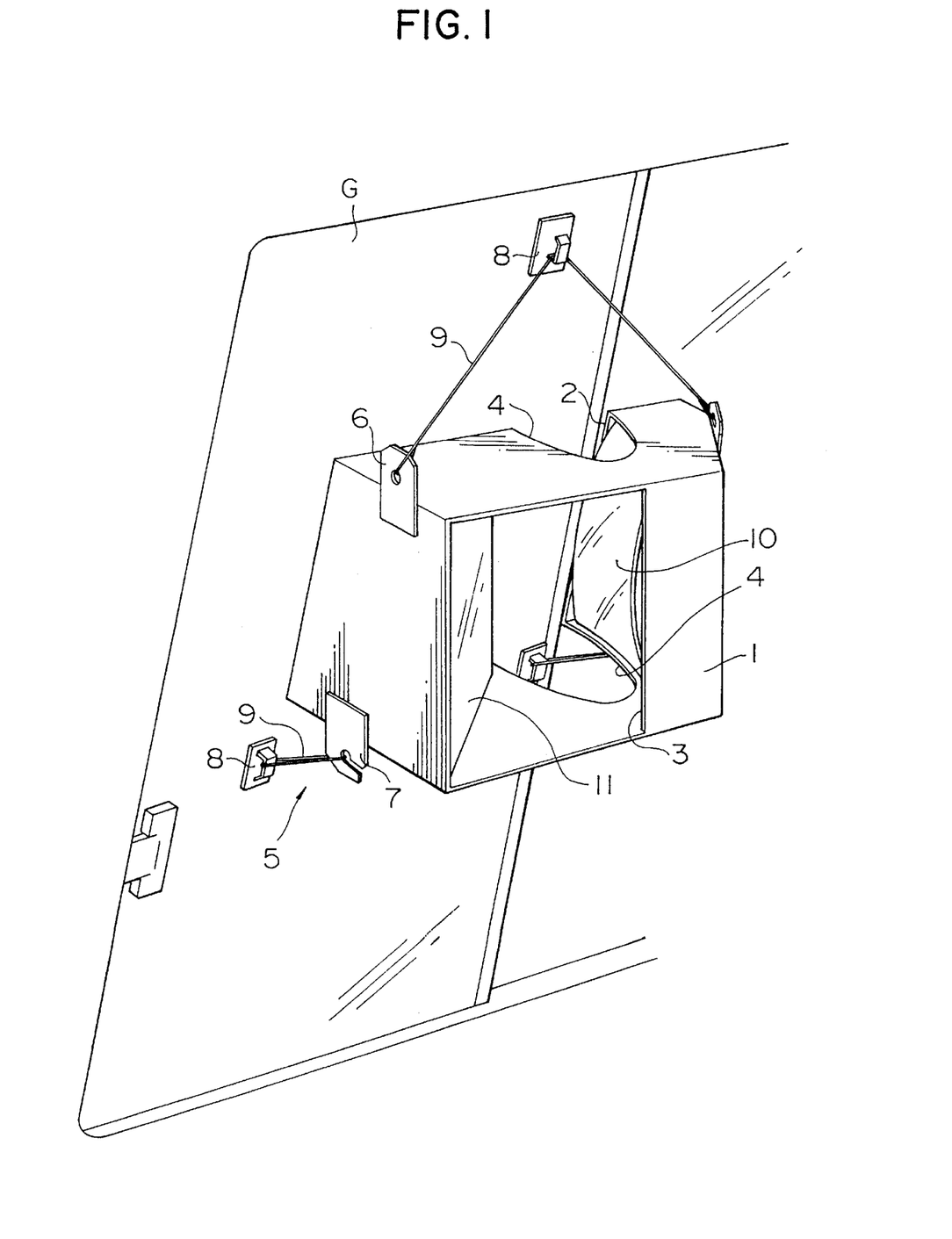
FIG. 1 is a perspective view illustrating one example of an embodiment according to the present invention is use.

Further, the mirror box 1 proper is fixedly situated on the inner side of the window-glass by means of supporting fixing means 5. In FIG. 1, upper attachment members 6 provided to the upper edges of both front and rear side walls of the casing 1, and lower attachment members 6 provided to the lower edges of both front and rear side walls thereof serve as the supporting fixing members by which the casing 1 is suspended and fixed by means of attachment cords 9 or the like possessing rigidity and elasticity, these cords connecting the aforementioned attachment members to hook members 8 fixed to the inner side of the window-glass G. It is needless to say that the supporting fixing means 5 are not limited to the arrangement illustrated in the figure, but any arrangement will suffice as long as the mirror box 1 is situated on the inner side of the window-glass G so that scenery outside of the vehicle is reflected in the object mirror 10 through the object window 2, examples of such means include, but are not limited to, suction cups, flat plane fasteners, adhesive agents, and the like.

Figure 9:
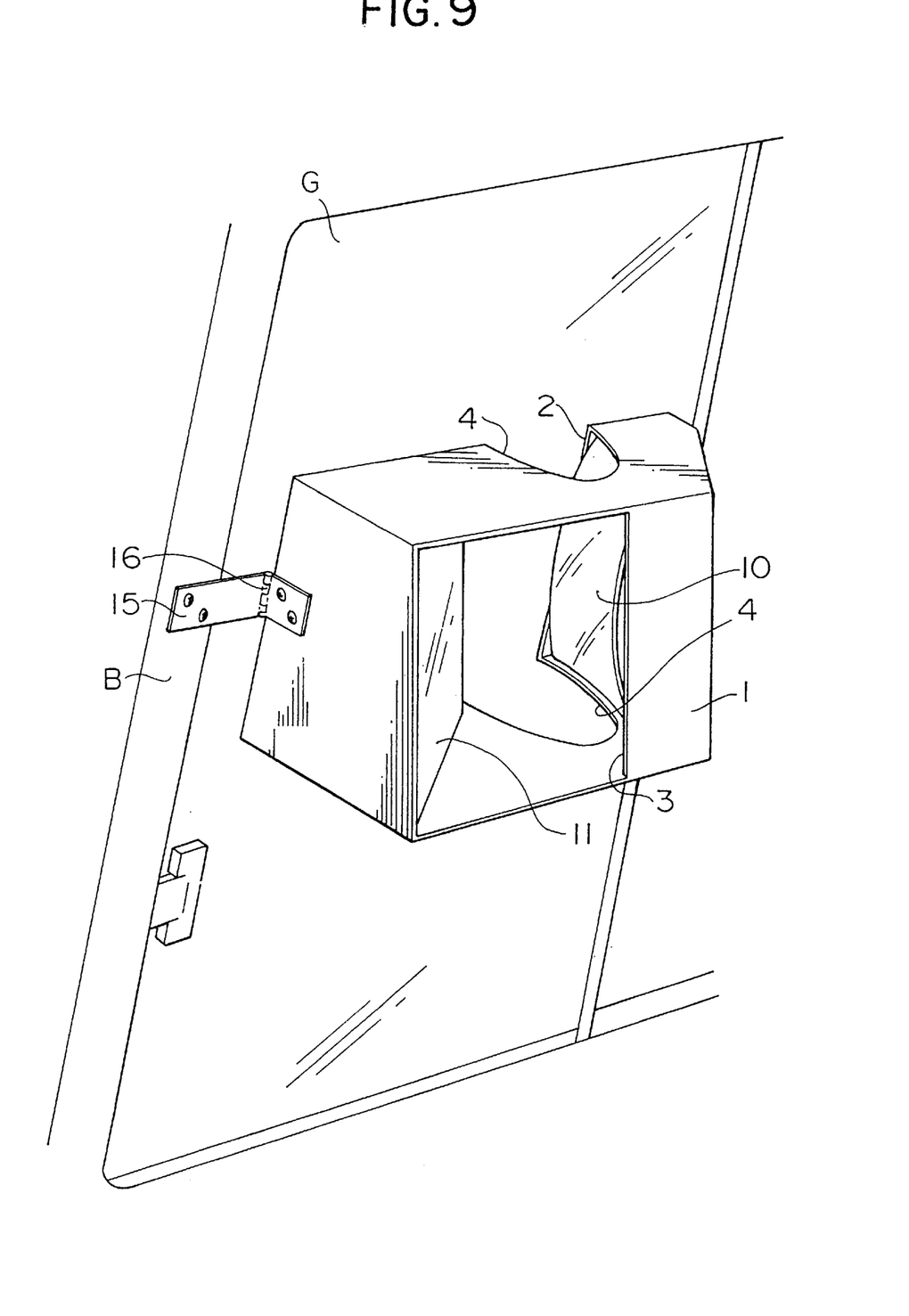
FIG. 9 is a perspective view of an embodiment of the present invention in the event that other supporting means are employed.

Moreover, as shown in FIG. 9, the device may be fixed to a vehicle frame or pillar around the window-glass G on the passenger side of the vehicle C by means of linked fixing. One example of such an arrangement involves supporting and fixing the mirror box 1 by means of e.g., L-shaped attachment arms, which have been fixed to a vehicle frame or pillar by means of screws, bolts, or the like. According to such an arrangement, the window-glass G may be free to be opened or closed, as the mirror box 1 proper is supported so as to be separated from the window-glass G, rather than directly supporting the mirror box 1 directly by the window-glass G. Moreover, by means of providing a hinge 16 to the position of the flexible member or the like of the attachment arm 15, the side-mirror device proper according to the present member can be retracted to the side, thus avoiding the device according to the present invention becoming a nuisance when the window has been opened.

Situated within this mirror box 1 are: an object mirror 10 which is provided at the forward portion of the mirror box facing diagonally rearward through the object window 2 provided at the front of the mirror box 1, and which has a doughnut-shaped surface; and an observation mirror 11 which is provided at the rearward portion of the mirror box facing diagonally forward through the observation window 3 provided at the rear of the mirror box 1, and which has a flat mirror surface so as to reflect the image projected by the object mirror 10 into the vehicle. Reference numeral 12 in the figures denotes object mirror fixing members which have an approximately L-shaped cross section, and which are used for fixing the object mirror 10 to the upper and lower side walls of the mirror box 1. Reference numeral 11 in the figures denotes observation mirror fixing members which have an approximately L-shaped cross section, and which are used for fixing the observation mirror 11 to the upper and lower side walls of the mirror box 1.

The object mirror 10 mounted to the interior side of the window-glass G has a mirror surface "a" which has a continuously curved formation so that a cross-section made in the horizontal direction (x-axial direction) is a concave surface retracted in a concave manner and a cross-section made in the vertical direction (y-axial direction) is a convex surface bulging in a convex manner. In other words, as shown in FIG. 6, this mirror surface a comprises a doughnut-shaped surface forming the inner hollow portion of a doughnut shaped object, or a drum-shaped surface (not shown). Further, the curvature in the horizontal direction and the curvature in the vertical direction are approximately equal, so that the radius of the inner hollow portion of the doughnut shaped object "r1" and the radius of the ring-shaped portion forming the doughnut "r2" are in a relation of "r1"="r2". When the relation of "r1"="r2" holds, and when the ring-shaped portion of the doughnut-shaped object is imagined to be hollow, the mirror surface formed of the inner surface and the outer surface of one portion of the hollow side of the inside of this imagined side wall can be approximately matched one upon another by means of rotating 90°. Incidentally, it is desirable that the curvature of this doughnut be approximately that of a perfect circle in both horizontal and parallel directions, so as to obtain a projected mirror image not distorted in either direction. Also, if the mirror is in a state where "r1"≠"r2", the projected mirror image obtained by means of the object mirror 10 is distorted and fuzzy, and thus has little practical use.

When the projected mirror image obtained by means of this doughnut-surface object mirror 10 is directly viewed, the image appears as a non-reverse erect image, and since this mirror is pointed in a direction diagonally rearward of the vehicle C, the image observed in the object mirror 10 is exactly the same as the scenery observed in a direction diagonally rearward of the vehicle C with the naked eye. Further, in the event that this object mirror 10 is pointed in a downward direction and used independently, numerals and characters such as speed limit or limitations which are posted on the pavement appear non-inverted horizontally and vertically, so that it is possible to read the numerals and characters as they are. In other words, while an image viewed with a standard flat mirror appears inverted in the horizontal right and left directions, an image directly observed in such a doughnut-shaped mirror surface or a drum-shaped mirror surface which has a continuously curved formation, i.e., concave in the horizontal x-axial direction and convex in the vertical y-axial direction, is not inverted so, but appears as a non-inverted erect image. Moreover, when this mirror is rotated 90°, i.e., so as to be convex in the horizontal x-axial direction and concave in the vertical y-axial direction, and an image is directly viewed thereby, the image obtained is vertically inverted.

On the other hand, the observing mirror 11 is a standard flat mirror formed with a flat surface, which reflects the projected mirror image obtained by the object mirror 10, so that the driver sitting in the driver's seat can observe the projected image. As shown in the figure, the side-mirror device according to the present invention takes into consideration that the device is to be situated to the interior side of the window-glass G on the passenger side, i.e., approximately to the side of the driver, in that the observation mirror 11 is provided within the mirror box 1 and toward the inside of the vehicle at an angle approximately 45° to the side of the vehicle. Corresponding to this, the object mirror 10 also is provided within the mirror box 1 and toward the outside of the vehicle at an angle approximately 45° to the side of the vehicle. It is needless to say that in the event that the mutual relation between the position of the driver and the side-mirror are other than described above, the relative angles of the object mirror 10 and the observation mirror 11 are to be changed accordingly.

Figure 2:
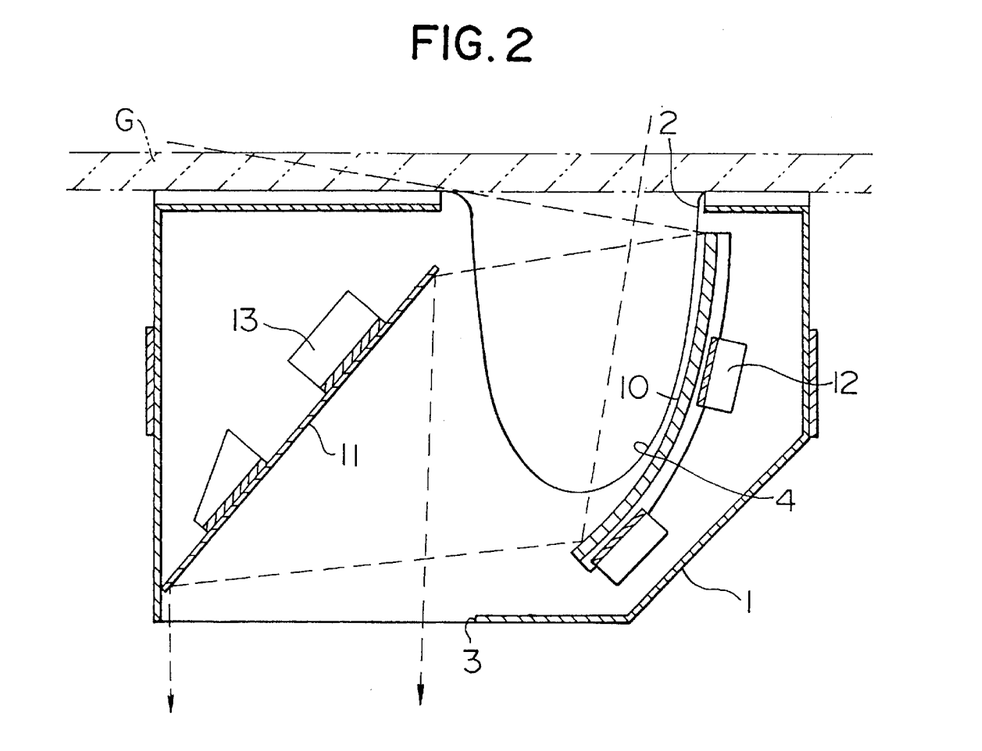
FIG. 2 is a horizontal cross-section diagram of the same.
Figure 3:
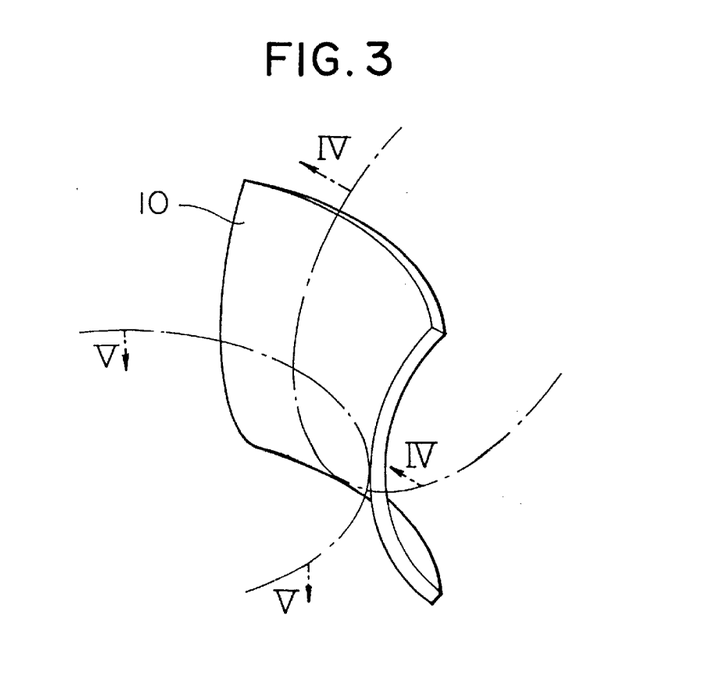
FIG. 3 is a perspective view of the object mirror comprising a portion of the present invention.

Also, since the reflected mirror image obtained by means of the observation mirror 11 is a horizontally inverted image of the non-inverted erect image obtained by means of the object mirror 10, the image is inverted horizontally, as shown in FIG. 2. Further, the focal distance and the like of this reflected mirror image is set so that the image appears clearly at the position at which the driver sitting in the driver's seat observes the image, i.e., at the position of the eyes. Moreover, although the observation mirror 11 is shown in the figure as being a flat mirror, this may be made to be a convex mirror or a convex mirror with a slight and gentle curvature; any such arrangement is employable as long as the projected mirror image from the object mirror 10 is reflected to the driver, so that the driver can observe the projected mirror image from the object mirror 10.

Figure 7:
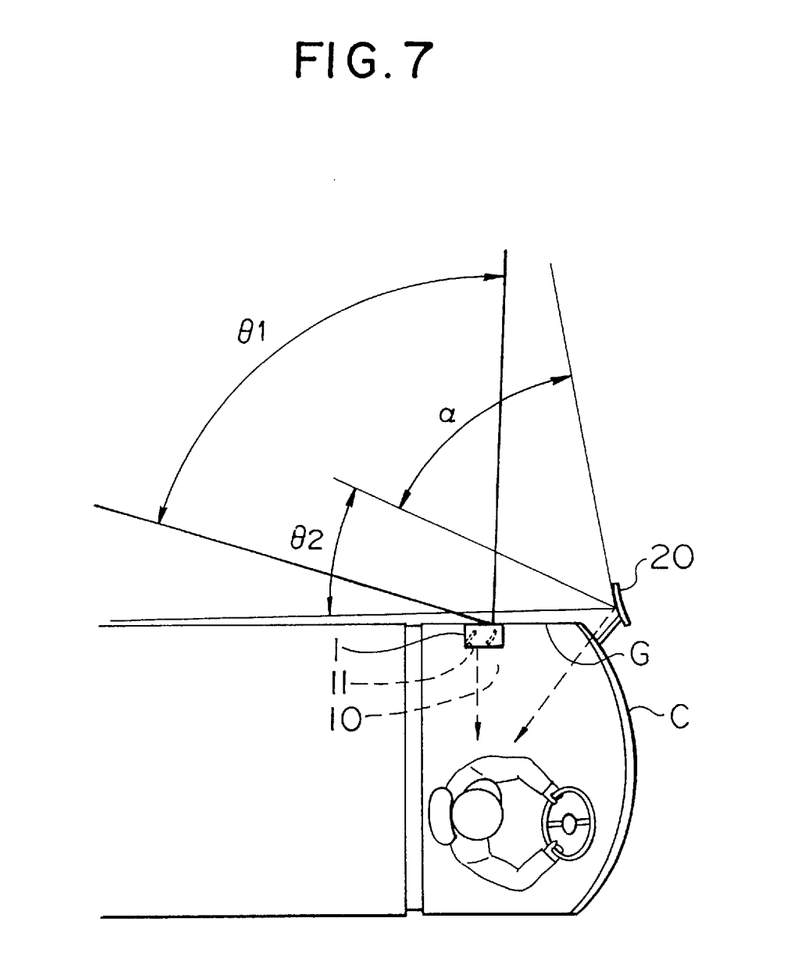
FIG. 7 is a schematic cross-section view describing the difference between the angle of view of a known side-mirror device and the angle of view of the present invention.

Next, a description of an example of using the side-mirror device according to the present invention will be made. As shown in FIG. 7, the side-mirror device is situated on the interior side of the window-glass G on the passenger side, approximately on the side of the driver, by means of fixing. As shown in FIG. 1, the mirror box 1 is fixed so that the side wall of the device facing outwards from the vehicle, i.e., the side on which the object window 2 is provided, is made to face the window-glass G, by means of attachment cords 9 passed through the upper attachment members 6 and lower attachment members 7 and secured to hook members 8 stuck to the surface of the window-glass G. Accordingly, the scenery in the diagonally rearward direction outside of the vehicle is cast on the object mirror 10 via the object window 2, and then the projected mirror image is reflected on the observation mirror 11 and passed through the observation window 3 so that the driver can observe the reflected mirror image.

The field of view obtained by the side-mirror device according to the present invention is denoted by q 1 in FIG. 7, and covers a wide area starting from a position slightly away from the side of the vehicle and reaching to almost a position perpendicular to the vehicle. On the other hand, the field of view according to the known side-mirror device 20 using a convex mirror is denoted by q 2, and is an acute angle which begins from a position almost alongside the side of the vehicle and reaching to a position diagonally rearward of the vehicle. Accordingly, the side-mirror device according to the present invention provides sight of the road conditions of a road intersecting an acute angle intersection at an acute angle from the direction of behind the passenger side, which cannot be observed at all with the known side-mirror device 20, due to being a blind spot a.

Figure 8A:
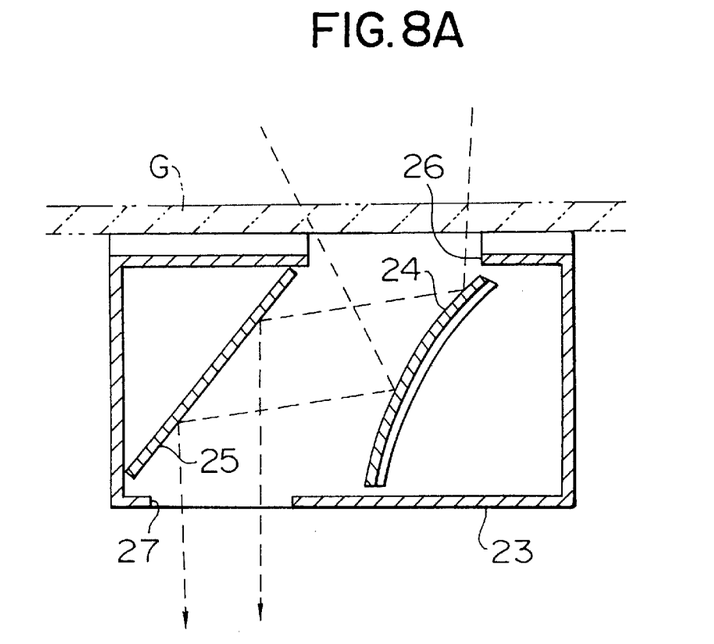
FIG. 8A is a schematic cross-section view illustrating the angle of view according to a side-mirror device constructed by situating a convex mirror toward the front of a mirror box and a flat mirror to the rear thereof, as a comparison with the device according to the present invention.
Figure 8B:
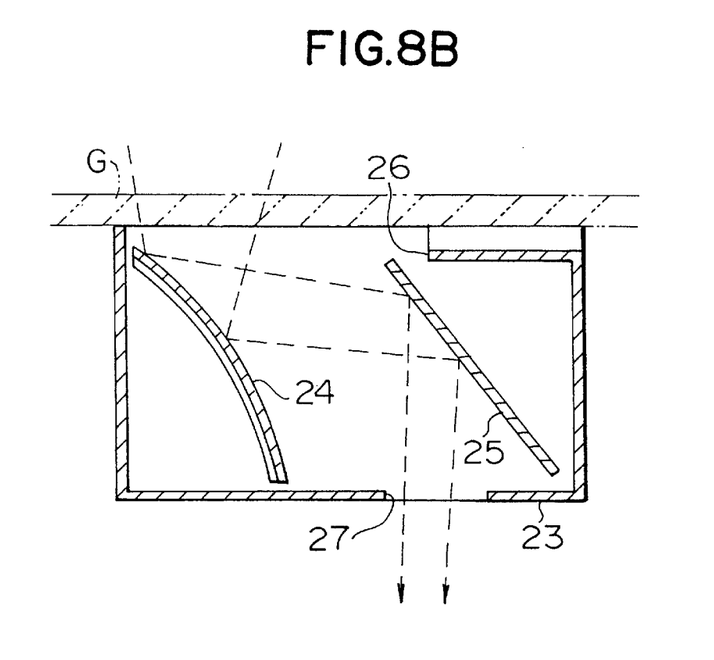
FIG. 8B is a schematic cross-section view illustrating the angle of view according to a side-mirror device constructed by situating a flat mirror toward the front of a mirror box and a convex mirror to the rear thereof, as a comparison with the device according to the present invention.

Now, with reference to FIGS. 8A and 8B, comparison will be made with a box-type side-mirror which is formed by situating a convex mirror 24 serving as an object mirror and a flat mirror 25 serving as an observation mirror in a diagonally opposed manner within a mirror box 23 fixed within a vehicle C, which mirror box 23 is provided with an object window 26 on the side wall facing outward from the vehicle and an observation window 27 on the side wall facing inward. The positions of the convex mirror 24 and flat mirror 25 are as shown in FIGS. 8A and 8B: in FIG. 8A, the convex mirror 24 is positioned toward the front of the mirror box 23 facing diagonally rearward; in FIG. 8B, the convex mirror 24 is positioned toward the rear thereof facing diagonally forward.

However, in the box-type side mirrors shown in FIG. 8A and 8B, the angle of view is not wide even if the two mirrors are situated in the same manner as the side-mirror device according to the present invention, due to the convex mirror 24 and flat mirror 25 being in close proximity, and even if the object or observation windows 26 and 27 are formed larger, there is a limit to such an arrangement. Accordingly, the field of view to the rear and to the side cannot be sufficiently gained, and a wide field of view such as obtained with the present invention cannot be obtained.

The present invention is comprised as described above, with a doughnut-shaped mirror serving as an object mirror 10 and a flat mirror serving as an observation mirror 11, whereby the field of view does not become narrow or small even when the aforementioned object mirror and observation mirror are placed in close proximity within the mirror box 1, and wherein the road conditions of a road intersecting an acute angle intersection at an acute angle from the direction of behind the passenger side can be visibly confirmed in a reliable manner from the driver's seat. Confirmation in such a situation has been considered difficult with known art. Moreover, the present invention does not need to be mounted outside the vehicle but can be mounted within the vehicle, so that the mirror does not protrude from the body of the vehicle in a marked manner, thus avoiding the danger of external usage and providing for safe use.

The aforementioned is accomplished by means of the present invention comprising: a mirror box 1 provided along the lengthwise direction of the side of a vehicle C; an object window 2 provided toward the front of the outer wall of the aforementioned mirror box facing outwards from the vehicle; an observation window 3 provided toward the rear of the inner wall of the aforementioned mirror box facing inward of the vehicle; an object mirror 10 having a doughnut-shaped mirror surface or a drum-shaped mirror surface which has a continuously curved formation so that a cross-section made in the horizontal direction is a concave surface retracted in a concave manner and a cross-section made in the vertical direction is a convex surface bulging in a convex manner, the aforementioned object mirror 10 being provided within the mirror box 1 at the object window 2 so as to face diagonally rearwards; and an observation mirror 11 provided facing forwards within the mirror box 1 at the observation window 3 so as to reflect the projected mirror image from the object mirror 10 toward the interior of the vehicle.

Due to the object mirror 10 situated within the mirror box being formed as a doughnut-shaped surface which is formed continuously curved so that a cross-section made in the horizontal direction is a concave surface and a cross-section made in the vertical direction is a convex surface, and due to this object mirror 10 being situated facing diagonally rearwards, the scenery in the diagonally rearward direction outside of the vehicle is formed into a projected mirror image which can be viewed as a non-reverse erect image while maintaining a wide angle of view.

Although the projected image obtained by this object mirror 10 appears inverted when viewed by the driver, due to being reflected off of the observation mirror 11 so as to be visible through the observation window 3, a wide field of view can be observed regarding the conditions outside of the vehicle on the passenger side thereof in a diagonally rearward direction. Not only can the scenery to the side of the passenger seat be observed, but the scenery diagonally rearward thereof can be seen as well, and the road conditions of a road intersecting an acute angle intersection at an acute angle from the direction of behind the passenger side for example can be confirmed from the driver's seat in a reliable manner. Accordingly, the movement of other vehicles, pedestrians, and the like on a road intersecting an acute angle intersection can be comprehended, and thus providing for safe passage through acute intersections.

Also, the entire device is made small by means of placing the object mirror 10 which faces diagonally rearward and the observation mirror 11 which faces diagonally forward in close proximity to each other within the mirror box 1, and a sufficiently wide angle of view is formed even though the device is provided within the vehicle. The device being fixed to the inner side of the window-glass G does not create a nuisance as the entire device is of a compact size as described above, and providing the device within the vehicle increases safety, as it does not necessitate mounting an extra protrusion on the outside of the vehicle.

Although omitted in the drawings, the side-mirror device according to the present invention may also be used as a curve mirror device. An example of employing the side-mirror device according to the present invention as a curve mirror device involves, e.g., mounting the device on the side of a garage where a vehicle exits from the garage directly onto the road., or the like. In this arrangement, the doughnut-shaped object mirror 10 is provided to the rear of and facing diagonally forward within the mirror box 1 which is mounted on the exit portion of a garage, and the flat observation mirror 11 is provided to the front of and facing diagonally rearward within the mirror box 1 so as to face the object mirror 10. According to such an arrangement, the conditions to the side of the garage can be confirmed upon exiting from the garage, and thus allowing for safely proceeding onto the road or the like.

Moreover, the argument of the present invention involves bringing a blind spot which cannot be directly viewed by general means into the field of view, by means of employing as an object mirror a doughnut-shaped surface or a drum-shaped surface which has a continuously curved formation and is concave in one direction and convex in another direction intersecting the first direction at a right angle, and using this object mirror such that the projected mirror image is reflected and observed. Accordingly, it goes without saying that all modifications in design, structure, or otherwise, which may be made by those skilled in the art, are intended to be covered within the present invention as fall within the scope of the argument set forth.

What is claimed is:

1. A wide-angle side mirror device, comprising:

a mirror box having a front and a rear, and first and second side walls;

an object window disposed in the first side wall of the mirror box;

an observation window disposed in the second wall of the mirror box;

an object mirror having a curved shape which is concave in horizontal cross section and convex in vertical cross section, and disposed to face out the object window and diagonally rearwards;

an observation mirror disposed in the mirror box to reflect a mirror image from the object mirror through the observation window.

2. A wide-angle side mirror device according to claim 1, wherein the object mirror has a doughnut shape.

3. A wide-angle side mirror device according to claim 2, wherein the object mirror has a drum shape.

4. A wide-angle side mirror device according to claim 1, wherein the object mirror has a degree of curvature in horizontal cross section approximately the same as a degree of curvature in vertical cross section.

5. A wide-angle side mirror device according to claim 2, wherein the object mirror has a degree of curvature in horizontal cross section approximately the same as a degree of curvature in vertical cross section.

6. A wide-angle side mirror device according to claim 3, wherein the object mirror has a degree of curvature in horizontal cross section approximately the same as a degree of curvature in vertical cross section.

7. A wide-angle side mirror device according to claim 1, wherein the observation mirror is a flat mirror.

8. A wide-angle side mirror device according to claim 2, wherein the observation mirror is a flat mirror.

9. A wide-angle side mirror device according to claim 3, wherein the observation mirror is a flat mirror.

10. A wide-angle side mirror device according to claim 4, wherein the observation mirror is a flat mirror.

11. A wide-angle side mirror device according to claim 5, wherein the observation mirror is a flat mirror.

12. A wide-angle side mirror device according to claim 6, wherein the observation mirror is a flat mirror.

13. A wide-angle side mirror device according to claim 1, wherein said object mirror is fixed toward the front of said mirror box to face out the object window, and the observation mirror is fixed toward the rear of said mirror box to face out the observation window.

14. A wide-angle side mirror device according to claim 2, wherein said object mirror is fixed toward the front of said mirror box to face out the object window, and the observation mirror is fixed toward the rear of said mirror box to face out the observation window.

15. A wide-angle side mirror device according to claim 3, wherein said object mirror is fixed toward the front of said mirror box to face out the object window, and the observation mirror is fixed toward the rear of said mirror box to face out the observation window.

16. A wide-angle side mirror device according to claim 1, further comprising means for attaching said mirror box to an inside of a window glass in a vehicle.

17. A wide-angle side mirror device according to claim 2, further comprising means for attaching said mirror box to an inside of a window glass in a vehicle.

18. A wide-angle side mirror device according to claim 3, further comprising means for attaching said mirror box to an inside of a window glass in a vehicle.

19. A wide-angle side mirror device according to claim 1, further comprising means for linkedly fixing said mirror box to a vehicle frame or pillar adjacent a window of a vehicle.

20. A wide-angle side mirror device according to claim 2, further comprising means for linkedly fixing said mirror box to a vehicle frame or pillar adjacent a window of a vehicle.

21. A wide-angle side mirror device according to claim 3, further comprising means for linkedly fixing said mirror box to a vehicle frame or pillar adjacent a window of a vehicle.

* * * * *